United States Patent
Daya et al.

(10) Patent No.: US 12,169,519 B2
(45) Date of Patent: *Dec. 17, 2024

(54) SKIN TONE FILTER

(71) Applicant: Pinterest, Inc., San Francisco, CA (US)

(72) Inventors: Rahim Daya, San Francisco, CA (US); Laksh Bhasin, San Francisco, CA (US); Xixia Wang, Oakland, CA (US); Stephanie Rogers, San Francisco, CA (US); Candace Williams, San Francisco, CA (US); Ricardo Kuchimpos, San Francisco, CA (US); Candice Morgan, San Francisco, CA (US); Larkin Brown, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/361,481

(22) Filed: Jul. 28, 2023

(65) Prior Publication Data

US 2023/0376525 A1 Nov. 23, 2023

Related U.S. Application Data

(63) Continuation of application No. 17/145,823, filed on Jan. 11, 2021, now Pat. No. 11,762,899, which is a (Continued)

(51) Int. Cl.
*G06T 7/40* (2017.01)
*G06F 16/51* (2019.01)
(Continued)

(52) U.S. Cl.
CPC ............ *G06F 16/535* (2019.01); *G06F 16/51* (2019.01); *G06T 7/40* (2013.01); *G06V 40/10* (2022.01)

(58) Field of Classification Search
CPC ......... G06F 16/535; G06F 16/51; G06T 7/40; G06V 40/10; G06Q 50/01
(Continued)

(56) References Cited

U.S. PATENT DOCUMENTS 6,109,921 A   8/2000 Yau
8,270,682 B2  9/2012 Stubler
(Continued)

OTHER PUBLICATIONS

Muhammad et al., "Hair detection, segmentation, and hairstyle classification in the wild", Image and Vision Computing, vol. 71, Mar. 2018, pp. 25-37.

*Primary Examiner* — Sheela C Chawan
(74) *Attorney, Agent, or Firm* — Athorus, PLLC

(57) ABSTRACT

Methods, systems, and apparatus, including computer programs encoded on computer storage media for receiving a set of images at a social media system, wherein each image includes one or more recognized features associated with one or more lightness values; indexing each image using the one or more recognized features and the associated range of lightness values; receiving a query; determining a first group of images that is responsive to the query; determining that the query triggers a lightness filter to be displayed on the user device; providing the first group of images for display on a user interface with one or more lightness filter indicators; and in response to a user selection of one of the one or more lightness filter indicators: filtering the first group of images to determine a filtered group of images, and updating the images provided for display according to the filtered group of images.

20 Claims, 6 Drawing Sheets

Related U.S. Application Data continuation of application No. 16/270,167, filed on Feb. 7, 2019, now Pat. No. 10,891,331.

(51) Int. Cl.
*G06F 16/535* (2019.01)
*G06V 40/10* (2022.01)

(58) Field of Classification Search
USPC .................................................. 382/100, 305
See application file for complete search history.

(56) References Cited

U.S. PATENT DOCUMENTS

| | | |
|---|---|---|
| 8,406,482 B1 | 3/2013 | Chien et al. |
| 8,421,818 B2 | 4/2013 | Abe et al. |
| 8,824,747 B2 | 9/2014 | Free |
| 9,064,279 B1 | 6/2015 | Tuan et al. |
| 9,076,029 B2 | 7/2015 | Free |
| 9,235,782 B1 | 1/2016 | Zomet et al. |
| 9,928,601 B2 | 3/2018 | Aarabi |
| 10,304,125 B1 | 5/2019 | Huisenga et al. |
| 10,866,716 B2 | 12/2020 | Sinclair et al. |
| 10,871,884 B1 | 12/2020 | Cole et al. |
| 10,891,331 B1 | 1/2021 | Daya et al. |
| 10,943,371 B1 | 3/2021 | Voss et al. |
| 11,010,894 B1 | 5/2021 | Shenk et al. |
| 11,069,094 B1 | 7/2021 | Evangelista et al. |
| 11,599,739 B2 | 3/2023 | Hayashi et al. |
| 11,762,899 B1 * | 9/2023 | Daya ............... G06Q 50/01 382/305 |
| 2002/0105662 A1 | 8/2002 | Patton et al. |
| 2004/0070592 A1 | 4/2004 | Dangin et al. |
| 2006/0077405 A1 | 4/2006 | Topfer et al. |
| 2007/0110305 A1 | 5/2007 | Corcoran et al. |
| 2009/0231356 A1 | 9/2009 | Barnes et al. |
| 2014/0047389 A1 | 2/2014 | Aarabi |
| 2016/0125624 A1 | 5/2016 | Liu et al. |
| 2017/0256084 A1 | 9/2017 | Iglehart et al. |
| 2018/0075523 A1 | 3/2018 | Odizzio et al. |
| 2018/0075524 A1 | 3/2018 | Odizzio et al. |
| 2018/0315336 A1 | 11/2018 | Shen et al. |
| 2018/0350071 A1 | 12/2018 | Purwar et al. |
| 2019/0166980 A1 | 6/2019 | Huang et al. |
| 2019/0197736 A1 | 6/2019 | Sugaya |
| 2019/0244260 A1 | 8/2019 | Lin et al. |
| 2019/0377969 A1 | 12/2019 | Kuo et al. |
| 2020/0051298 A1 | 2/2020 | Nguyen et al. |
| 2020/0090256 A1 | 3/2020 | Yeh et al. |
| 2020/0265233 A1 | 8/2020 | Jeong et al. |
| 2020/0319784 A1 | 10/2020 | Sinclair et al. |
| 2021/0015240 A1 | 1/2021 | Elfakhri et al. |
| 2021/0072887 A1 | 3/2021 | Sinclair et al. |
| 2021/0158619 A1 | 5/2021 | Sokal et al. |
| 2021/0298458 A1 | 9/2021 | Barron et al. |
| 2021/0326961 A1 | 10/2021 | Kandemiri |
| 2021/0374839 A1 | 12/2021 | Luo et al. |
| 2021/0390311 A1 | 12/2021 | Barron et al. |
| 2021/0390745 A1 | 12/2021 | Rykhliuk et al. |

\* cited by examiner

SKIN TONE FILTER

CROSS-REFERENCE TO RELATED APPLICATIONS

This application is a continuation of and claims benefit to U.S. application Ser. No. 17/145,823, filed on Jan. 11, 2021, entitled "LIGHTNESS FILTER" which is a continuation of U.S. application Ser. No. 16/270,167, filed on Feb. 7, 2019, entitled "SKIN TONE FILTER," and is now issued as U.S. Pat. No. 10,891,331, the disclosures of which are incorporated herein by reference in their entireties.

BACKGROUND

This specification relates to filtering graphical content for display on a user device.

A conventional search system can search for graphical content using a search query, e.g., one or more textual query terms, submitted to the search system. One typical concern for such a search system is whether the search system can efficiently return content relevant to the user providing the query.

SUMMARY

This specification describes technologies relating to content presentation. These technologies generally involve indexing a collection of images based on one or more features identified in the images. In particular, one or more lightness values can be determined for one or more features in each image. These lightness values can be associated with the corresponding images in the index. One or more filters can optionally be provided for filtering the images based on the lightness values.

For example, the technologies can index a collection of images containing features representing parts of a human body, e.g., human faces, and associated lightness values for each of the faces. When images are provided for display to users responsive to particular queries, one or more lightness filters can be provided representing, e.g., skin tone lightness ranges for the faces represented in the images. Each lightness filter can represent a range of lightness values. In response to a user selection of a particular lightness filter, the presented image results can be filtered according to their respective lightness values.

In general, one innovative aspect of the subject matter described in this specification can be embodied in methods that include the actions of receiving a set of images at a social media system, wherein each image includes one or more recognized features, and wherein each recognized feature is associated with one or more lightness values; indexing each image in the set of images using the one or more recognized features and the associated range of lightness values; receiving a query from a user device; determining a first group of images from the set of images that is responsive to the query; determining that the query is a query that triggers a lightness filter to be displayed on the user device; providing the first group of images for display on a user interface of the user device, the user interface including one or more lightness filter indicators, each lightness filter indicator being associated with a range of lightness values; and in response to a user selection of one of the one or more lightness filter indicators: filtering the first group of images according to a range of lightness values of the selected lightness filter indicator and the one or more lightness values associated with each image of the first group of images to determine a filtered group of images, and updating the images provided for display according to the filtered group of images.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented as to realize one or more of the following advantages. Image features and their associated lightness values are used to index image data. The image features and lightness values can then be used to identify images responsive to a query. In particular, filters can be provided based on the image features and ranges of lightness values. The presented images can be filtered based on a user selection of one or more ranges of lightness values for a given feature. The filtered images improve user experience by allowing a user to choose images most representative of his/her physical characteristics. Furthermore, search ranking algorithms are modified to include items that are suitable for users belonging to a specific skin tone group.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
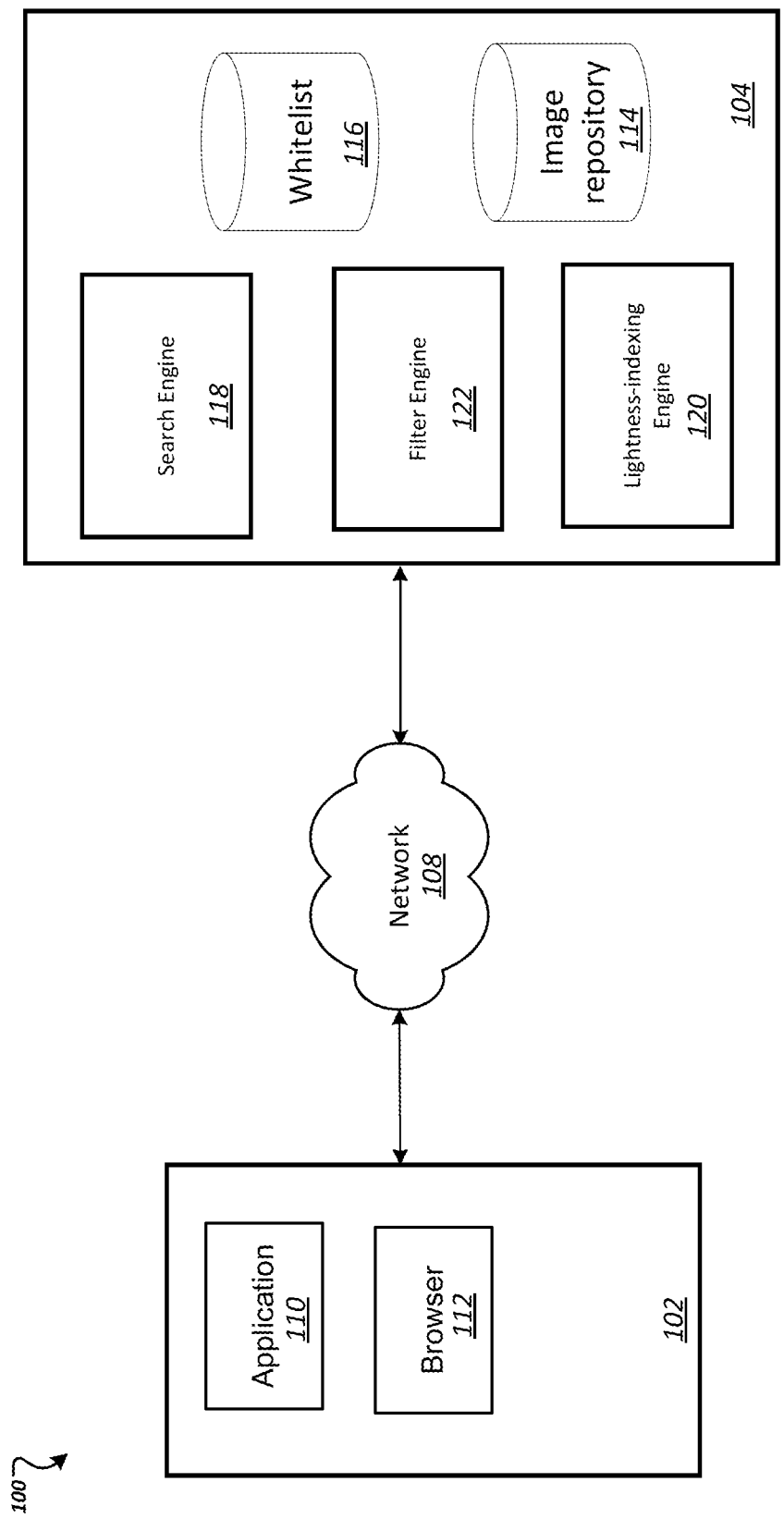
FIG. 1 is a block diagram of an example social media system.

FIG. 1 is a block diagram of an example social media system 100. The social media system 100 includes a representative user device 102 and a social media platform 104 communicably coupled to a network 108.

In some embodiments, the user device 102 can be a mobile device of a user. The mobile device can be a mobile phone, tablet, or other portable computing devices. The user device 102 is shown as including an application 110 and a browser 112. The user device 102 can include other hardware and software components, which are not illustrated for clarity.

The application 110 can be a mobile application specifically configured to communicate with the social media platform 104 using the network 108, e.g., the internet. For example, the user can access content from the social media platform 104 using a user interface of the application 110 presented by a display of the user device 102. Specifically, the application 110 can be associated with a visual bookmarking and discovery platform in which users can view images saved or uploaded by other users and links to web pages containing those images, and can store collections of selected images. Users can use the application 110, for example, to explore different subjects and save content for later viewing.

The browser 112 can be a web browser application used to access content through the network 108. For example, the browser 112 can be used by a user to view websites and search for content using a search engine. In particular, the user can access the social media platform 104 through the browser, e.g., by directing the browser to a particular address associated with the social media platform 104.

The social media platform 104 includes an image repository 114, a whitelist 116, a search engine 118, a lightness-indexing engine 120, and a filter engine 122. The social media platform 104 can communicate with user-installed applications or browsers on various user devices. The social media platform 104 can be a visual bookmarking and discovery platform in which users can view images saved or uploaded by other users and can store collections of selected images.

The social media platform 104 can receive requests for particular content from the application 110 or browser 112. In response to the request, the social media platform 104 can identify responsive data and provide the data to the user device 102 for display. For example, a user can enter a particular search query in a search field of a user interface for the social media platform 104. The search query is provided to the social media platform 104. The social media platform 104 identifies content responsive to the query using the search engine 118, for example, a collection of images matching one or more terms of the search query. The images matching one or more terms of the search query can be identified and selectively retrieved, for example, from the image repository 114. The social media platform 104 then provides particular responsive content, e.g., a group of the identified images, to the user device 102 for display in either the user interface provided by the application 110 or the browser 112.

A user can filter the identified images through interaction with one or more user-selectable filters provided for display on the user device 102. For example, a user can select one or more ranges of lightness values in a lightness filter displayed in the application 110 or the browser 112. The user can select ranges of lightness values through qualitative or quantitative input. For example, the user can select qualitative measures using graphical representations depicting particular ranges of lightness values associated with a particular range of lightness values. In response to receiving the selected range of lightness values, the social media platform 104 can select a subgroup from the group of the identified images for display on the user device 102 based on the range of lightness values associated with each image. For example, the user-selectable filter can include ranges of lightness values corresponding to human skin tone values and the social media platform 104 can display a group of human figures having a user-selected skin tone value range. In another example, the user-selectable filter can operate on other parameters such as hue values or saturation values of features in an image.

The image repository 114 includes images submitted to the social media platform 104. This can include images provided by multiple users, e.g., account holders, of the social media platform 104 as well as images submitted by third party content providers, e.g., advertisers.

The search engine 118 uses the query terms to search the image repository 114 for images responsive to the query. For example, the search engine can use an index that identifies images in the image repository 114 based on one or more features associated with the images. The index can further include keywords associated with each image in the image repository. The search engine 118 can, for example, identify images that are responsive to a query based on one or more operations for comparing the query to the indexed keywords. The one or more operations can include comparing individual terms or phrases in the query as well as various query expansion operations such as using synonyms for the query terms.

The indexing engine 120 further indexes images in the image repository 114 with detected feature values. For example, the indexing engine 120 can index images in the image repository 114 based on the ranges of lightness values of different features present in the images. In one example, if an image includes a human figure, the indexing engine 120 can associate the human figure's skin tone lightness value, e.g., the face skin tone lightness value, with the image in the index.

The filter engine 122 filters images identified by the search engine 118 responsive to a query in response to user interaction using one or more user-selected filters, e.g., a filter that selects a range of lightness values. For example, if a query keyword matches one of the terms or phrases stored in the whitelist 116, a user-selectable filter is present with the identified images on a user interface on the user device 102. If a user selects one of the filter values, the filter engine 112 filters the images and only those fitting the filter criteria are displayed. In some implementations, the filter engine 122 can be part of the search engine 118 and together they perform the functions of retrieval, search, and ranking of images.

Figure 2A:
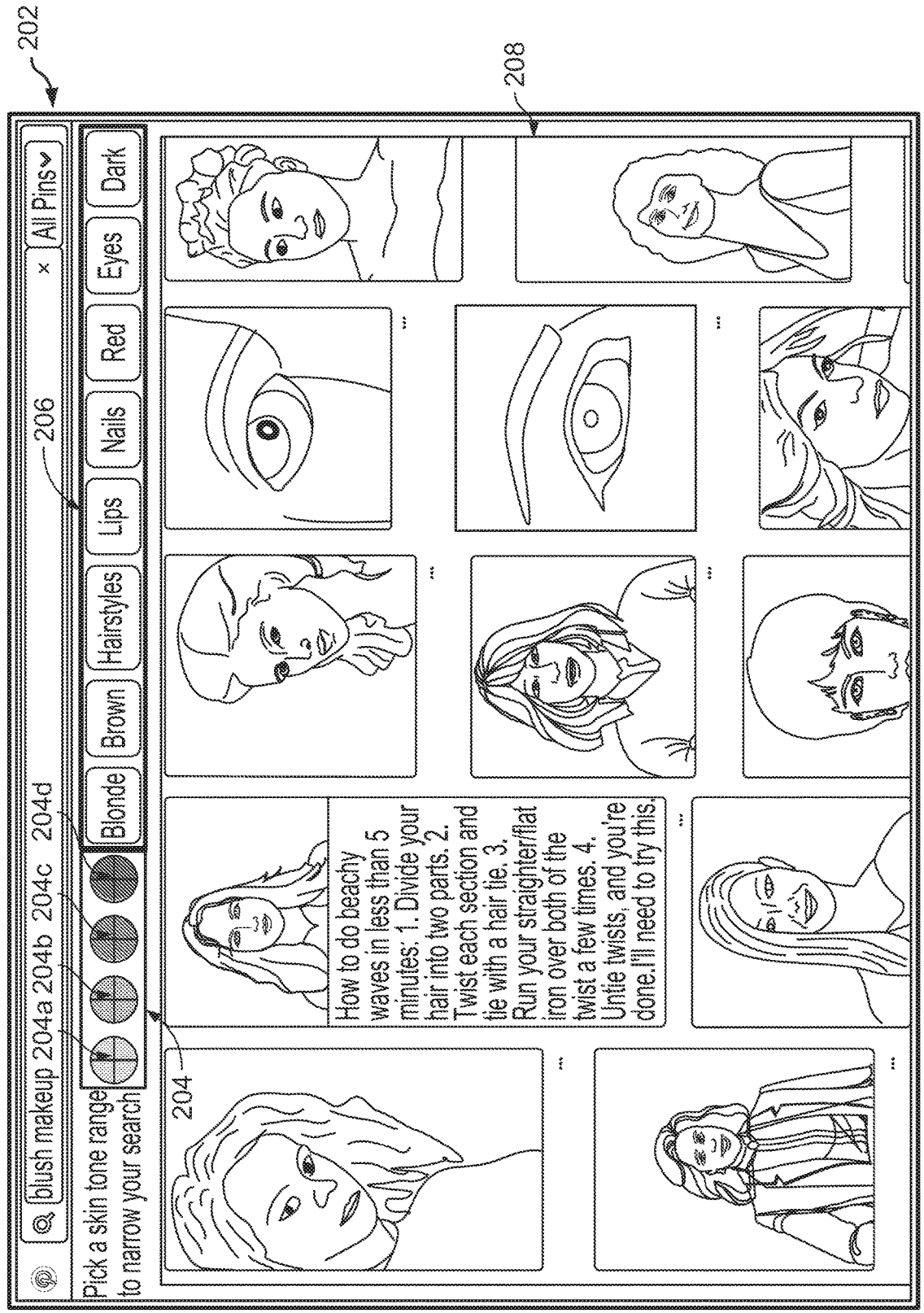
FIGS. 2A-2C are diagrams of example user interfaces for displaying images responsive to a query.

FIG. 2A is a diagram of an example user interface 200 for presenting images responsive to a query. For example, the user interface 200 can be displayed as part of the application 110 (FIG. 1) or the browser 112 (FIG. 1). The user interface 200 includes a search bar 202 where a user can submit one or more queries. The user interface 200 also includes an image display area 208 where images responsive to the user-submitted query are displayed. In some implementations, if the submitted query keyword matches one of those stored in the whitelist 116 (FIG. 1), the user interface 200 further displays a user-selectable filter 204 with filter indicator e.g., filter indicators 204a-204d. In some cases, the user interface 200 also displays one or more suggested terms 206 related to the submitted query.

For example, as illustrated by FIG. 2A, a user has submitted a query "blush makeup" to the social media system 104 (FIG. 1). As a result, images containing features related to "blush makeup" as determined by the search engine 118 are shown in the image display area 208, for example, by matching query terms to keywords associated with indexed images. The features in the result images can have different associated tone lightness values. For example, the images in the image display area 208 can have different skin tone lightness values associated with the displayed parts of human body. Furthermore, since the query "blush makeup" is included in the whitelist 116, the user-selectable filter 204 are displayed along with the responsive images. The user-selectable filter 204 includes the lightness indicators 204a-204d.

Figure 2B:
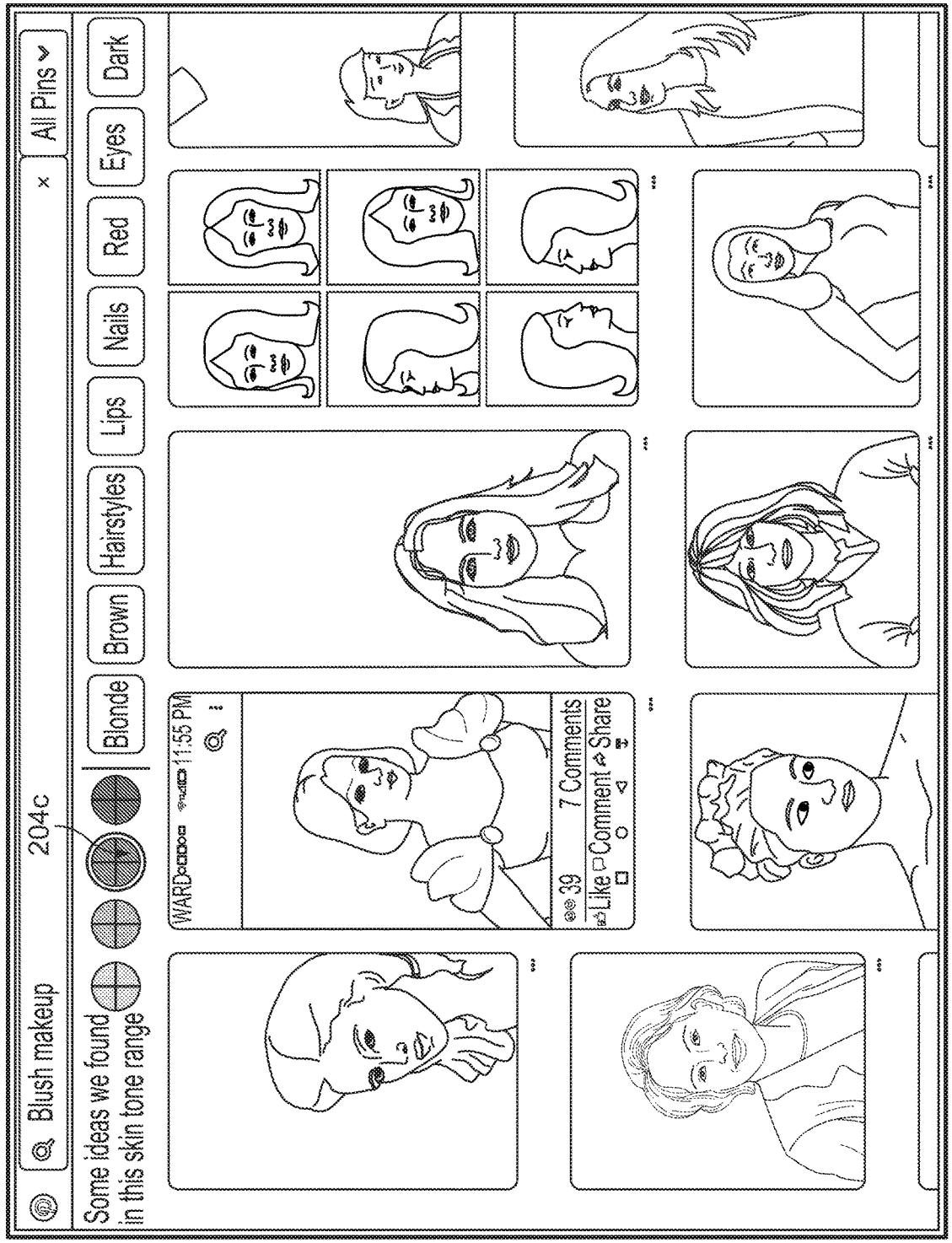
Figure 2C:
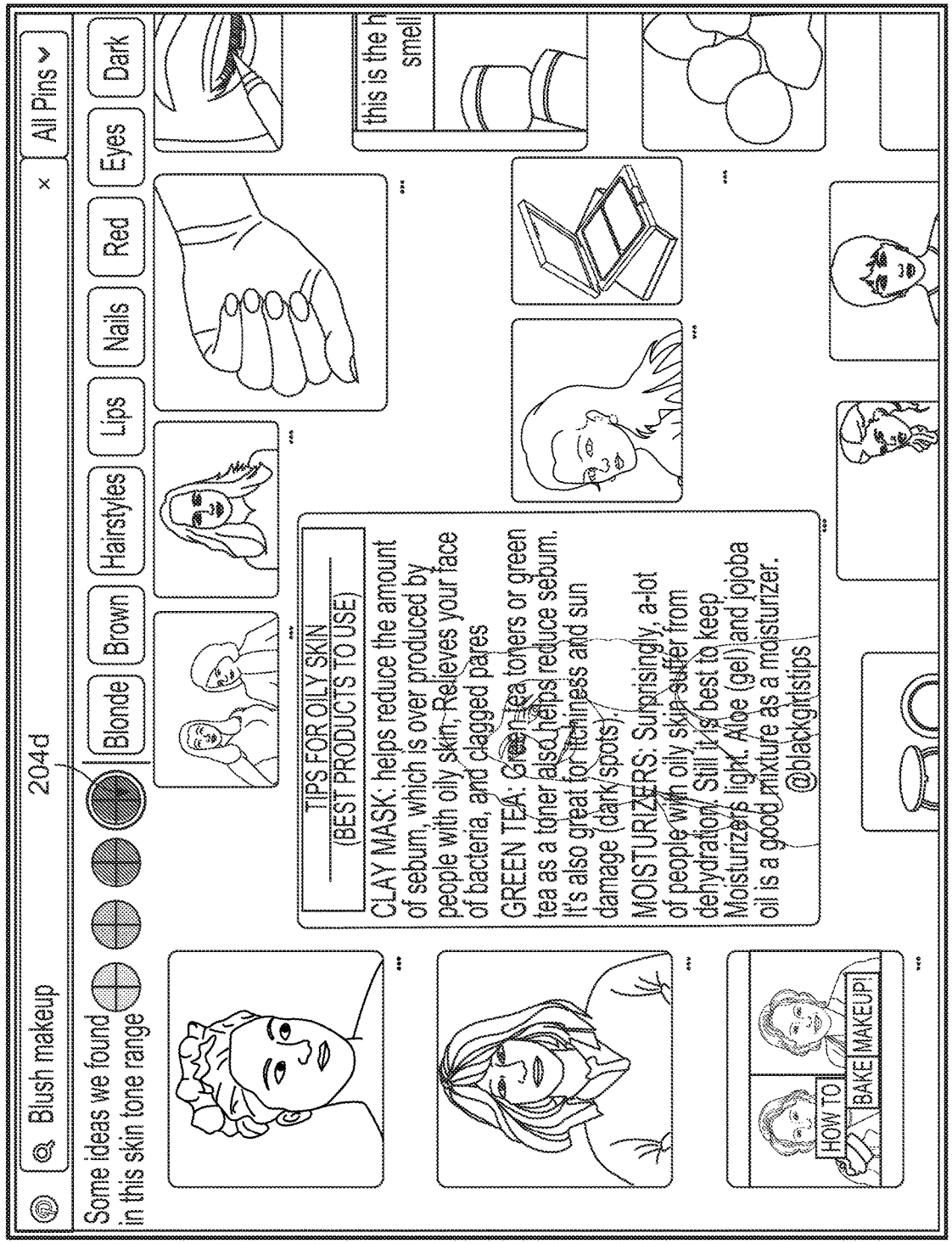

In response to the user selecting a particular lightness indicator representing a particular range of lightness values, a filtered subgroup of images will be displayed on the user interface as determined by the filter engine 122 (FIG. 1). In some implementations, the filter engine 122 selects images with human figures having a skin tone corresponding to the range of lightness values specified by the selected filter. For example, in FIG. 2B, the user has selected the lightness indicator 204c. As a result, images with human figures having the corresponding skin tone lightness values are displayed. That is to say, all the displayed human figures in FIG. 2B have skin tone lightness values within the range of the lightness indicator 204c. In another example, in FIG. 2C, the user has selected a lightness indicator 204d corresponding to a lower range of lightness values. Therefore, images results with human figures having a darker skin tone are displayed. The images are indexed by the particular features presented, e.g., human with hair, and lightness values associated with the features, e.g., representing skin tone, as described in FIG. 3.

Figure 3:
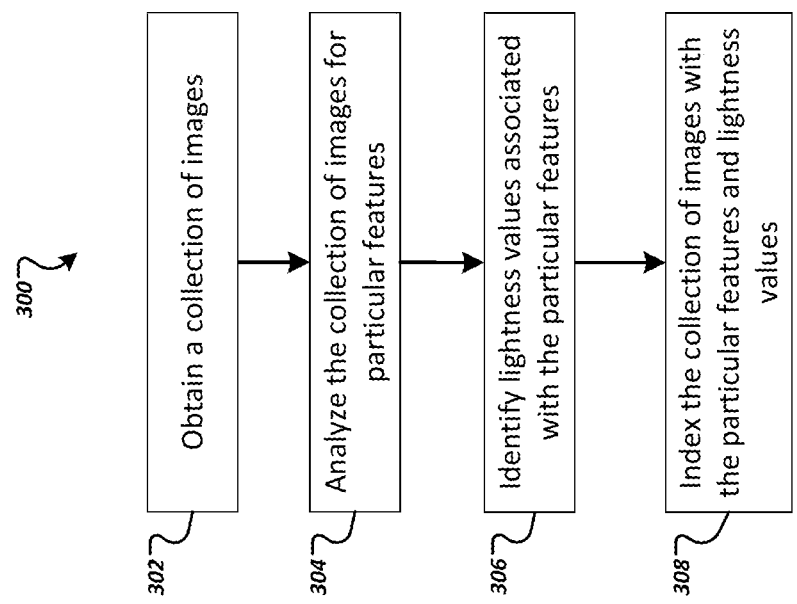
FIG. 3 is a flow diagram of an example process for storing and indexing images.

FIG. 3 is a flow diagram of an example process 300 for storing and indexing images. For convenience, the process 300 will be described as being performed by a system of one or more computers, located in one or more locations, and programmed appropriately in accordance with this specification. For example, a social media platform, e.g., the social media platform 104 (FIG. 1), appropriately programmed, can perform the process 300.

The system obtains a collection of images (302). For example, the system can receive images from multiple sources, such as from registered users of the social media platform 104 or from third party advertisers. To facilitate image searching, the system indexes the images using one or more keywords. For example, the system can require the account holders or the advertisers to provide keywords associated with the images when they submit the images to the social media platform 104. The system then stores the images and the associated keywords in one or more databases, e.g., the image repository 114 (FIG. 1). In another example, the system can infer additional keywords for an image based on shared links and similar images. In another example, the system can perform image retrieval by non-keyword features.

The system analyzes the images for particular features (304). In some implementations, the system uses one or more machine learning models to automatically recognize particular features in the images and index the image using keywords describing those recognized features. Example machine learning models include Region-based Convolutional Network (R-CNN), Fast Region-based Convolutional Network (Fast R-CNN), Faster Region-based Convolutional Network (Faster R-CNN), Region-based Fully Convolutional Network (R-FCN), You Only Look Once (YOLO), Single-Shot Detector (SSD), Mask Region-based Convolutional Network (Mask R-CNN), or any combination of these. Furthermore, the system can use additional image processing and analysis techniques such as those available in the open-source library OpenCV.

The system next identifies ranges of lightness values associated with the particular features of the images (306). For example, if an image includes a human figure, the system can determine a corresponding lightness value for different features, e.g., the human figure's hair, skin tone, etc. Alternatively or optionally, the system can identify other types of values associated with the particular features. Although this specification describes indexing and filtering based on identified features and their corresponding lightness values, in practice, the indexing and filtering can be implemented using any types of values of the identified features. For example, the system can determine corresponding hair types (value) for different hair (feature) in images, e.g., curly hair, wavy hair, coily hair, and so on. In another example, the system can determine corresponding face shapes (value) for different faces (feature) in images, e.g., oval face, square face, round face, etc. In another example, the system can determine corresponding body shapes (value) for different human bodies (feature), e.g., endomorph, mesomorph, ectomorph, and so on.

In some implementations, the system analyzes a set of images using software configured to identify particular values within a color space for particular features. For example, the software can analyze an image of a feature representing a part of a human body, e.g., human face, and extract values for lightness from the image as defined by the CIELAB color space. In another example, the third-party software can detect skin tone values using machine learning and image processing in other color spaces such as the RGB color space, and the results are later converted to CIELAB color spaces. The CIELAB color space expresses color as numerical values of lightness, green-red, and blue-yellow components. The lightness values range from 0 to 100. One or more lightness values can be selected for the feature from each image. For example, different portions of a human face can have different lightness values. The system can store multiple values or, alternatively, can combine values to generate a single lightness value, e.g., an average value.

The system indexes the images with recognized particular features and lightness values (308). For example, an image having a human face and associated with the keyword "makeup" can also be associated with a lightness value of 73 in the index. This allows each image to be filtered according to whether the associated lightness value is within a filtered range of lightness values.

Figure 4:
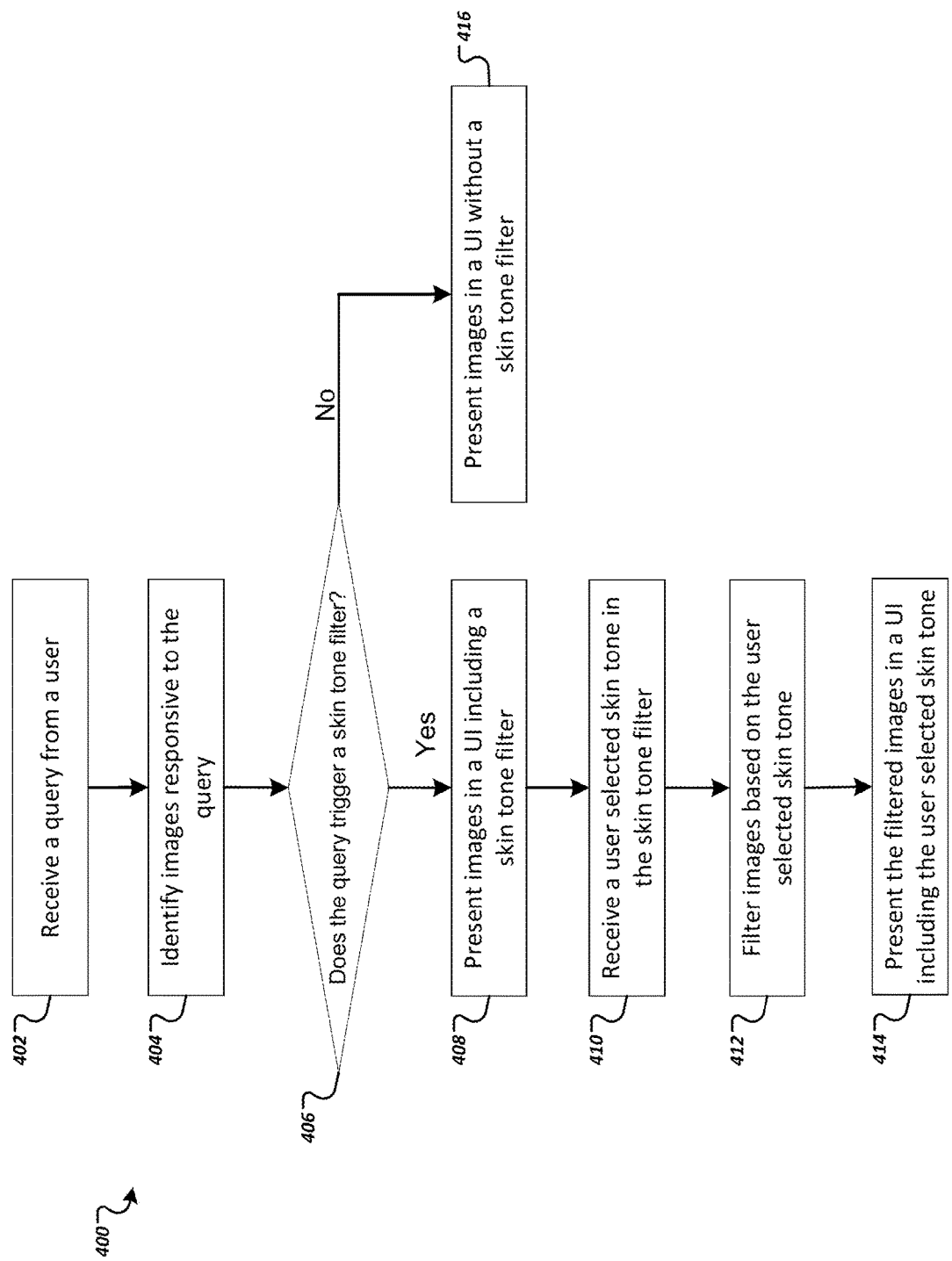
FIG. 4 is a flow diagram of an example process for presenting images on a user device that are responsive to a query.

FIG. 4 is a flow diagram of an example process 400 for presenting images responsive to a user query. For convenience, the process 400 will be described as being performed by a system of one or more computers, located in one or more locations, and programmed appropriately in accordance with this specification. For example, a social media platform, e.g., the social media platform 104 (FIG. 1), appropriately programmed, can perform the process 400.

The system receives a search query from a user (402). For example, the user can submit the query "blush makeup" using the application 110 (FIG. 1) or the browser 112 (FIG. 1) on the user device 102 (FIG. 1).

After receiving the query, the system identifies images responsive to the query (404). For example, the system can use a search engine e.g., the search engine 118 (FIG. 1), to search an image repository, e.g., image repository 114 (FIG. 1), for images matching the query. In some cases, as described in FIG. 3 and the related descriptions, images in the image repository have been indexed using keywords submitted by users of the social networking platform or by machine learning models.

The system determines whether the query triggers one or more filters (406). In some implementations, the determination is based on whether one or more query terms are included within a whitelist, e.g., whitelist 116 (FIG. 1). The whitelist stores a group of special keywords, phrases, and their related terms. If the query term matches one of the special keywords or phrases stored in the whitelist, then the filter is triggered and the search results are presented in an interface that includes one or more associated filters (408). For example, if one or more of the query terms are present in the whitelist as associated with a lightness filter, the system can display one or more filters in addition to the returned images. For example, the query keyword can be "hairstyle" and the filter can be a skin tone filter.

In some implementations, the whitelist contains thousands of queries and can be curated by checking specific categories of popular queries, e.g., queries related to hair or beauty, and selecting queries that elicit results with a variety of skin tone values. The whitelist can be extended and mapped through queries related to a user's input query already on the whitelist.

If the query terms are not included in the whitelist, the system presents images in a search results interface without the skin tone filter (416).

After displaying the one or more filters, the system receives a user input selecting a particular range of values of the filter (410). For example, if the filter is a skin tone filter, the user can select a filter corresponding to a particular range of lightness values corresponding to a skin tone the user would like to view.

In response to receiving the filtering selection, the system filters the images (412). The system uses the lightness values associated with the filter and the lightness values indexed for each of the image search results to determine which images fall within the selected lightness range. For example, in FIG. 2C, a user has selected a value corresponding to a dark skin tone. As a result, the system displays a subgroup of the returned images responsive to the query "blush makeup," wherein each displayed image displays a human figure with an indexed dark skin tone.

In some cases, an image matches the search query and is presented in the image search results, but that image does not include a particular feature or the corresponding lightness values. For example, an image in FIG. 2A shows a product image of a blush makeup kit as a result of the query "blush makeup," but that product image does not show any features representing parts of a human body. The product image, however, is still relevant to the query because the content in the product image can relate to a particular skin tone. For example, the product image can include a type of blush that suits a particular skin tone lightness. As a result, the system can still filter such product images based on its relevance to the particular selected skin tone lightness value.

In some implementations, in addition to or in alternative to using the filter engine 122, the system can reorganize the returned image results by rewriting queries. The system can rerank images based on a combination of images satisfying the selected filter indicator and images that are relevant to a rewritten query. For example, an image can be deemed relevant to the rewritten query if the image contains certain recognized features, e.g., human faces, satisfying the selected filter values, or if the image contains other recognized features, e.g., products, that are relevant to the rewritten query. If a user searches for "blush makeup" and selects the darkest skin tone indicator, the system can rewrite the original query "blush makeup" into a new query that causes images that are relevant and engaging for dark skin colors and blush makeup to rank higher, e.g., "dark blush makeup." In addition to using the selected skin tone indicator, other features can be used to rewrite queries to cause different rankings of images for different users, such as a particular user's geolocation, preset skin tone preference, and so on.

The system updates the user interface to present the set of search result images having lightness values associated with the selected filter (414). As a result, the user is able to view the query, the returned images, and the selected filter in the user interface.

In some implementations, the updated user interface also includes the filter to allow the user to select a different range of filter values. For example, the user can select a different filter indicator on the user interface in FIG. 2B to be presented with an updated user interface. The system will use the newly selected filter indicator to perform filtering on the original set of images responsive to the query, or will rewrite the query to obtain image results using the selected filter indicator and the original query.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:
1. A computer-implemented method comprising:
 determining, for each image of a collection of images, a respective lightness value;
 associating the respective lightness value for each corresponding image of the collection of images;

determining, in response to a query, a first plurality of images from the collection of images that are responsive to the query;
causing the first plurality of images to be presented on a client device;
causing a lightness filter including a plurality of lightness filter indicators to be presented on the client device;
receiving a first interaction with a first lightness filter indictor of the plurality of lightness filter indicators indicating a selection of the first lightness filter indicator;
determining, based at least in part on the selection with the first lightness filter indicator, a second plurality of images from the first plurality of images; and
causing the second plurality of images to be presented on the client device.

2. The computer-implemented method of claim 1, wherein each lightness filter indicator of the plurality of lightness filter indicators corresponds to a range of lightness values.

3. The computer-implemented method of claim 1, wherein determining the second plurality of images from the first plurality of images includes determining that the respective lightness values associated with the second plurality of images is within a range of lightness values associated with the first lightness filter indicator.

4. The computer-implemented method of claim 1, wherein the respective lightness values correspond to at least one of a CIELAB color space or a RGB color space.

5. The computer-implemented method of claim 1, wherein each respective lightness value corresponds to at least one of a skin tone associated with a body part of a first subject or a hair of a second subject.

6. A computing system, comprising:
one or more processors; and
a memory including program instructions that, when executed by the one or more processors, cause the one or more processors to at least:
determine, in response to a query, a first plurality of images from a collection of images that are responsive to the query, wherein at least a portion of the first plurality of images includes an associated skin tone value;
cause at least a portion of the first plurality of images to be presented on a client device;
determine, based at least in part on a first selection of a first skin tone filter indicator, a second plurality of images from the first plurality of images; and
cause at least a portion of the second plurality of images to be presented on the client device.

7. The computing system of claim 6, wherein:
the program instructions that, when executed by the one or more processors, further cause the one or more processors to at least:
determine that the query triggers skin tone filtering; and
cause a skin tone filter that includes a plurality of skin tone filter indicators to be presented concurrently with the at least a portion of the first plurality of images; and
the first skin tone filter indicator is selected from the plurality of skin tone filter indicators.

8. The computing system of claim 7, wherein each skin tone filter indicator of the plurality of skin tone filter indicators corresponds to a range of skin tone values.

9. The computing system of claim 7, wherein determining that the query triggers skin tone filtering includes:
determining that at least one query term of the query is included in a predetermined plurality of keywords.

10. The computing system of claim 6, wherein determining the second plurality of images from the first plurality of images includes determining that the associated skin tone values of the second plurality of images is within a range of skin tone values associated with the skin tone filter indicator.

11. The computing system of claim 6, wherein the program instructions that, when executed by the one or more processors, further cause the one or more processors to at least:
determine, for each image of the collection of images, a respective lightness value; and
associate the respective lightness value for each corresponding image of the collection of images.

12. The computing system of claim 11, wherein determining the respective lightness values for each image of the collection of images includes:
determining at least one feature lightness value corresponding to at least one body portion represented in each image.

13. The computing system of claim 12, wherein:
the at least one feature lightness value includes a plurality of feature lightness values; and
determining respective lightness values includes an average lightness value that is based at least in part on a combination of the plurality of feature lightness values.

14. The computing system of claim 6, wherein the program instructions that, when executed by the one or more processors, further cause the one or more processors to at least:
determine, based at least in part on a second selection of a second skin tone filter indicator, a third plurality of images from the first plurality of images; and
cause at least a portion of the third plurality of images and at least a portion of the second plurality of images to be presented on the client device.

15. The computing system of claim 6, wherein the program instructions that, when executed by the one or more processors, further cause the one or more processors to at least:
rewrite the query based at least in part on the first selection of the skin tone filter indicator to generate a rewritten query;
determine, based at least in part on the rewritten query, a third plurality of images from the collection of images that are responsive to the rewritten query; and
cause at least a portion of the third plurality of images to be presented on the client device.

16. A method, comprising:
determining, in response to a query, a first plurality of images that are responsive to the query, wherein at least a portion of the first plurality of images includes an associated skin tone value;
causing at least a portion of the first plurality of images to be presented on a client device;
causing a skin tone filter including a plurality of user-selectable skin tone filter indicators to be presented on the client device concurrently with the presentation of the at least a portion of the first plurality of images;
determining, based at least in part on a first selection of a first skin tone filter indicator, a second plurality of images from the first plurality of images; and
causing at least a portion of the second portion of images to be presented on the client device.

17. The method of claim 16, further comprising:
determining that the query triggers skin tone filtering, wherein causing the skin tone filter to be presented on the client device is in response to the determination that the query triggers skin tone filtering.

18. The method of claim 17, wherein determining that the query triggers skin tone filtering includes:
determining that at least one query term of the query is included in a predetermined plurality of keywords.

19. The method of claim 16, further comprising:
determining, based at least in part on a second selection of a second skin tone filter indicator, a third plurality of images from the first plurality of images; and
causing at least a portion of the third plurality of images and at least a portion of the second plurality of images to be presented on the client device.

20. The method of claim 16, further comprising:
rewriting the query based at least in part on the first selection of the skin tone filter indicator to generate a rewritten query;
determining, based at least in part on the rewritten query, a third plurality of images from a collection of images that are responsive to the rewritten query; and
causing at least a portion of the third plurality of images to be presented on the client device.

* * * * *